United States Patent Office 3,045,035
Patented July 17, 1962

3,045,035
PROCESS FOR THE PRODUCTION OF
TETRAETHYL LEAD
Alberto Malatesta, Brooklyn, N.Y., assignor to Montecatini Società Generale per l'Industria Mineraria e Chimica, Milan, Italy, a corporation of Italy
No Drawing. Filed Oct. 15, 1957, Ser. No. 690,206
Claims priority, application Italy Oct. 15, 1956
14 Claims. (Cl. 260—437)

This invention relates to a new process of producing tetraethyl lead.

The difficulties that are generally encountered in the production of organo-metal compounds are well known. Particularly the classical methods of preparing such compounds are generally not suitable for commercial production, either because of their complicated techniques or low yields, or because they require the use of special solvents or very pure starting materials.

For the commercial preparation of tetraethyl lead and other organo-metal compounds (such as alkyl aluminum chlorides), recourse has hitherto been had to certain types of reactions, which involve technically feasible processes and cause the formation of the desired organo-metal compound at commercially acceptable yields.

Generally, these processes comprise reactions between a binary or tertiary alloy, suitably selected as far as its ratio of components is concerned, wherein one of the components is the metal to be bound to the organic residue while the other components are, in general, more or less highly electropositive metals and, as the other reactant, a halide of the alkyl to be bound to the metal (e.g. methyl bromide, ethyl chloride, propyl bromide).

These reactions are very difficult to carry out because of their exothermal character; the removal of the reaction heat is very important, particularly in the case of tetraethyl lead which is thermally unstable and, therefore, requires the use of thermal stabilizers both during the reaction and at the distillation stage.

In general, the tetraethyl lead thus obtained contains impurities deriving from a partial decomposition of the product, which impair to a substantial degree the stability of the product as an anti-knock mixture for fuels when, as is customary, the tetraethyl lead is mixed with suitable proportions of $C_2H_4Cl_2$ and $C_2H_4Br_2$.

Because of the reduced stability of these mixtures, after a period of storage sludges and mud separate from the liquid fuel and form deposits within the tanks or containers which lessens the commercial value of the product.

On the other hand, the classical process of producing tetraethyl lead is very expensive, because the alkali metals, Na or Na and K, which are used as lead alloys are converted into chlorides and as such as difficult to recover and re-use.

Moreover, three-fourths of the lead used does not participate in the formation of tetraethyl lead and this amount must be recovered and purified, to be recycled. In addition, the process is of the batch type, with all the inconveniences involved therewith.

Another method for preparing tetraethyl lead has been recently disclosed by Ziegler (Angewandte Chemie, 16, 424 (1955)). In this process a complex compound, $Na[Al(C_2H_5)_3F]Al(C_2H_5)_3$, which is a good electric conductor, is electrolyzed between a Pb anode and an Al cathode. Under these conditions and employing suitable voltage, current density the temperature values, the ethyl groups are transferred to the Pb anode where they form tetraethyl lead, while the aluminum deposits on the cathode: the tetraethyl lead which forms is withdrawn from the bottom of the electrolytic cell, which is continuously supplied with the complex compound.

The aluminum deposits can be again converted into triethyl aluminum by reacting with $H_2$ and ethylene, thus closing the cycle in which triethyl aluminum has only the function of transporting ethyl groups.

The reactions may be set forth as follows:

(1)  $4Al + 12C_2H_4 + 6H_2 \rightarrow 4Al(C_2H_5)_3$ (2)  $3Pb + 4Al(C_2H_5)_3 \rightarrow 3Pb(C_2H_5)_4 + 4Al$ By adding the two equations, the reaction may be stated more simply:

(3)  $Pb + 4C_2H_4 + 2H_2 \rightarrow Pb(C_2H_5)_4$

This process has several objectionable features, aside from the questions of yield and production costs: the tetraethyl lead produced in this manner is contaminated with triethyl aluminum whose only simple way of removal is by decomposition with water. In addition, the exploitation of the process is contingent upon a large scale production of triethyl aluminum, as approximately 47 parts of this compound are needed for the production of 100 parts tetraethyl lead.

I have now found that tetraethyl lead can be obtained directly according to Equation 3, by reacting, under certain pressure and temperature conditions, metallic lead, ethylene and hydrogen in the presence of a suitable organic solvent which may also contain previously formed tetraethyl lead, and which only has the function of dissolving the organo-metal compound as soon as it is formed.

The process, which can be easily carried out in a continuous manner, places, however, certain limitations upon the quality of the reactants and the reaction conditions.

The metallic lead used in the reaction should be in a state of very fine subdivision to provide a large reaction surface. It is also important that the metal surface be completely free of oxidation products. To obtain this, recourse can be had to the reduction of PbO with hydrogen, in the presence or absence of an inert substrate, or lead metal can be directly reduced to a fine powder by means of suitable apparatus.

The reactants and the solvent must be, as far as possible, free of impurities, in order to obtain higher yields. Various types of solvents can be used. However, in view of the particular uses of tetraethyl lead, it is preferable to use aliphatic hydrocarbons or light petroleum fractions, or, if desired, dichloroethane or dibromethane as solvents. In this manner the resulting product obtained can be directly employed as anti-knock agent in gasoline, without any distillation and/or other processing which may cause decomposition of the tetraethyl lead.

If an extremely pure tetraethyl lead is to be obtained, a low boiling solvent which is easily separable by distillation must be used.

The reaction can be carried out within a rather wide range of temperatures and pressures. In practice, however, the upper pressure limit is determined by the hydrogen pressure at which, in conjunction with a given temperature, hydrogen decomposes tetraethyl lead into ethane and lead according to the following reaction:

(4)  $Pb(C_2H_5)_4 + 2H_2 \rightarrow Pb + 4C_2H_6$

Since, according to Equation 3, a gaseous mixture consisting of ethylene and hydrogen at a ratio of 2:1 is used, in practice, a $H_2$-partial pressure of about 100 atm. results in a total operating pressure of about 250–260 atm. However, the operating pressure can be lower, in general between 50 and 100 atm.

The operating temperature range is relatively wide, the upper limit being determined by the temperature at which, under the specific operating conditions, tetraethyl lead is decomposed by $H_2$. In practice the useful range is from 50 to 130° C.

The following examples are presented to illustrate the invention without intent to thereby limit the scope of the appended claims.

*Example 1*

100 cc. of heptane, containing in suspension 10 g. of finely divided Pb, are introduced into a 500 cc. autoclave. $C_2H_4$ is added until a pressure of 40 atm. is reached, and then $H_2$ until the total pressure is 60 atm. The autoclave is heated to 80° C. and kept at this temperature for 4 hours, while stirring.

After cooling, the liquid is discharged, filtered and analyzed: it shows a tetraethyl lead content of 0.15%.

*Example 2*

Example 1 is repeated but at an ethylene partial pressure of 160 atm. and a $H_2$ partial pressure of 80 atm. and heating to 105° C. for 4 hours. The discharged liquid shows, after filtration, a tetraethyl lead content of 0.4%.

I claim:
1. A process of making tetraethyl lead according to the following general reaction scheme:

$$Pb + C_2H_4 + H_2 \rightarrow Pb(C_2H_5)_4$$

comprising reacting a suspension of elemental, unalloyed lead in an organic liquid, that is substantially inert in the reaction and is a solvent for tetraethyl lead, with molecular ethylene gas, and hydrogen gas, the partial pressure of the hydrogen gas being at least a plurality of atmospheres, the temperature being above room temperature but no higher than about 130° C.

2. The process of claim 1, wherein said tetraethyl lead solvent is heptane.

3. The process of claim 1, wherein said tetraethyl lead solvent is a light petroleum fraction.

4. The process of claim 1, wherein said tetraethyl lead solvent is dichlorethane.

5. The process of claim 1, wherein said tetraethyl lead solvent is dibromomethane.

6. The process of claim 1, wherein the ratio between the ethylene partial pressure and the hydrogen partial pressure is 2:1.

7. The process defined in claim 1, the said solvent being taken from the group consisting of liquid aliphatic hydrocarbons, light petroleum fractions and lower dichloro- and dibromo-saturated aliphatic hydrocarbons.

8. A process of making tetraethyl lead according to the following general reaction scheme:

$$Pb + C_2H_4 + H_2 \rightarrow Pb(C_2H_5)_4$$

comprising reacting a suspension of elemental, unalloyed lead in an organic liquid, that is substantially inert in the reaction and is a solvent for tetraethyl lead, with molecular ethylene gas, and hydrogen gas, the partial pressure of the hydrogen gas being at least a plurality of atmospheres, the temperature being above room temperature but below that at which tetraethyl lead is decomposed by the hydrogen.

9. A process of making tetraethyl lead by reacting lead, ethylene, and hydrogen, comprising reacting a suspension of divided, elemental, unalloyed lead in an organic liquid that is substantially inert in the reaction and is a solvent for tetraethyl lead, with hydrogen gas, and with molecular ethylene gas the partial pressure of the hydrogen being at least a plurality of atmospheres, the temperature being above room temperature but no higher than about 130° C., the said solvent being taken from the group consisting of liquid aliphatic hydrocarbons, light petroleum fractions, and lower dichloro- and dibromo-saturated aliphatic hydrocarbons, the total operating pressure being at least about 50 atmospheres.

10. The process of preparing tetraethyl lead which comprises charging a reaction zone containing finely divided, metallic, free and unalloyed lead suspended in a tetraethyl lead solvent taken from the group consisting of liquid aliphatic hydrocarbons, light petroleum fractions and lower dichloro- and dibromo-saturated aliphatic hydrocarbons with hydrogen gas, and molecular ethylene until the total pressure ranges from 50 to 260 atmospheres, the partial pressure of the hydrogen being above atmospheric; heating to a temperature ranging from 50° to 130° C. while stirring, and discharging the tetraethyl lead solution obtained.

11. A process of making tetraethyl lead according to the following general reaction scheme:

$$Pb + C_2H_4 + H_2 \rightarrow Pb(C_2H_5)_4$$

comprising reacting a suspension of elemental, unalloyed lead in an organic liquid, that is substantially inert in the reaction and is a solvent for tetraethyl lead, with hydrogen gas, and with molecular ethylene gas, the partial pressure of the hydrogen gas being at least a plurality of atmospheres, the treating being at about 50° to 130° C.

12. A process of making tetraethyl lead according to the following general reaction scheme:

$$Pb + C_2H_4 + H_2 \rightarrow Pb(C_2H_5)_4$$

comprising reacting a suspension of free, unalloyed lead in an organic liquid, that is substantially inert in the reaction and is a solvent for tetraethyl lead, with hydrogen gas, and with molecular ethylene gas, the partial pressure of the hydrogen gas being at least a plurality of atmospheres, the temperature being above room temperature but not higher than about 130° C., the total operating pressure being between about 50 and 260 atmospheres.

13. A process of making tetraethyl lead according to the following general reaction scheme:

$$Pb + C_2H_4 + H_2 \rightarrow Pb(C_2H_5)_4$$

comprising reacting a suspension of elemental, unalloyed lead in an organic liquid, that is substantially inert in the reaction and is a solvent for tetraethyl lead, with hydrogen gas and with molecular ethylene gas, the partial pressure of the hydrogen gas being at least about twenty atmospheres, the ethylene pressure being at least about forty atmospheres, the temperature being above room temperature but no higher than about 130° C.

14. The process defined in claim 13, the said solvent being taken from the group consisting of liquid aliphatic hydrocarbons, light petroleum fractions and lower dichloro- and dibromo-saturated aliphatic hydrocarbons.

References Cited in the file of this patent

UNITED STATES PATENTS

| | | |
|---|---|---|
| 2,087,656 | Rice | July 20, 1937 |
| 2,087,660 | Sullivan | July 20, 1937 |
| 2,850,513 | Pines | Sept. 2, 1958 |

OTHER REFERENCES

Hill et al.: Organic Chemistry, 1st Ed., 1945, pages 41–42.